United States Patent [19]

Hoeschele

[11] 4,205,158

[45] May 27, 1980

[54] COPOLYETHERESTER BASED ON ETHYLENE OXIDE-CAPPED POLY(PROPYLENE OXIDE) GLYCOL AND BRANCHING AGENT

[75] Inventor: Guenther K. Hoeschele, Wilmington, Del.

[73] Assignee: E. I. Du Pont de Nemours and Company, Wilmington, Del.

[21] Appl. No.: 24,859

[22] Filed: Mar. 28, 1979

[51] Int. Cl.$^2$ ............................................ C08G 63/18
[52] U.S. Cl. ............................ 528/300; 260/45.8 R; 260/45.85 R; 260/45.9 NC; 528/272; 528/297; 528/296
[58] Field of Search ............... 260/45.9 NC, 45.8 R, 260/45.85; 528/272, 296, 297, 300

[56] References Cited

U.S. PATENT DOCUMENTS

| | | | |
|---|---|---|---|
| T982,003 | 5/1979 | Hoeschele | 260/45.9 NC |
| 3,023,192 | 2/1962 | Shivers | 528/300 |
| 3,766,146 | 10/1973 | Witsiepe | 528/301 |
| 4,013,624 | 3/1977 | Hoeschele | 528/300 |

OTHER PUBLICATIONS

Wolfe, J. R. Jr., Rubber Chemistry & Technology, vol. 50, No. 4, 1977, pp. 688-703.

*Primary Examiner*—Lucille M. Phynes

[57] ABSTRACT

A copolyetherester composition is derived from terephthalic acid or ester forming equivalents thereof, 1,4-butanediol, an ethylene oxide-capped poly(propylene oxide) glycol and a branching agent having a functionality of 3-6. The ethylene oxide-capped poly(propylene oxide) glycol has an ethylene oxide content of from about 15-35 weight percent and a number average molecular weight ranging from about 1500-2800. The branching agent is present in the copolyetherester in a concentration of from about 1.5-6.0 equivalents per 100 moles of terephthalic acid or ester forming equivalent thereof. The copolyetherester composition contains from about 25-48 weight percent butylene terephthalate units and has a melt index at 230° C. of less than about 50 grams per 10 minutes. The copolyetherester compositions can be injection molded or extruded into various shaped articles, e.g., hose, with ease and exhibit good physical properties, e.g., good low temperature properties and high strength.

8 Claims, No Drawings

COPOLYETHERESTER BASED ON ETHYLENE OXIDE-CAPPED POLY(PROPYLENE OXIDE) GLYCOL AND BRANCHING AGENT

BACKGROUND OF THE INVENTION

Thermoplastic copolyetheresters can be described as copolymers consisting of recurring long chain and short chain ester units joined through ester linkages. The long chain ester units are formed by esterification of a dicarboxylic acid with a polyether glycol, the short chain ester units by esterification of a dicarboxylic acid with a low molecular weight diol.

Relatively soft copolyetheresters (hardness <40D) based on poly(tetramethylene oxide) glycol (PTMEG) in which butylene terephthalate is the principal short chain ester unit are known. These polymers have good physical properties but do not process as well as desired in high-speed injection molding or extrusion operations due to their rate of hardening. One can improve hardening rates of the polymer by using during its preparation higher molecular weight PTMEG but this results in impairment of low temperature properties of the polymer. Replacing PTMEG with poly(propylene oxide) glycol (PPG) or poly(ethylene oxide) glycol does not yield acceptable polymer products because of the low reactivity of the former and the excessive water sensitivity of the latter. In the case of PPG, phasing during the melt condensation (inhomogeneity of the polymerization mass because of incompatibility of short and long chain ester units) is also a problem. Phasing can lead to nonrandomized polymer compositions having inferior physical properties. It is desirable to obtain a copolyetherester having both good physical properties and processing characteristics.

SUMMARY OF THE INVENTION

A novel copolyetherester composition has been discovered that has good physical properties, low moisture sensitivity, processes well and is economical to produce. More specifically, the copolyetherester composition of this invention is derived from terephthalic acid or its ester-forming equivalent, 1,4-butanediol, ethylene oxide-capped poly(propylene oxide) glycol, and a branching agent having a functionality of 3-6, said ethylene oxide-capped poly(propylene oxide) glycol having an ethylene oxide content of from about 15-35 weight percent and a number average molecular weight ranging from about 1500-2800, and said branching agent being present in a concentration of from about 1.5-6.0 equivalents per 100 moles of terephthalic acid or ester-forming equivalent thereof; and said copolyetherester composition containing from about 25-48 weight percent 1,4-butylene terephthalate units and having a melt index at 230° C. of less than about 50 grams per 10 minutes. Preferably, the ethylene oxide content of the ethylene oxide-capped poly(propylene oxide) glycol is from about 20-30 weight percent and the number average molecular weight is from about 1900-2500. The concentration of branching agent is preferably from 2.5-5.5 equivalents per 100 moles of terephthalic acid or ester-forming equivalent.

DETAILED DESCRIPTION OF THE INVENTION

The copolyetheresters of the present invention are prepared from terephthalic acid, or its ester-forming equivalent, such as dimethyl terephthalate, 1,4-butanediol, and ethylene oxide-capped poly(propylene oxide) glycol having an ethylene oxide content of from about 15-35 weight percent and a number average molecular weight of from about 1500-2800. Further, the copolyetherester composition must contain a branching agent having a functionality of 3-6 in a concentration of from about 1.5-6.0 equivalents per 100 moles of terephthalic acid or ester-forming equivalent. The copolyetherester composition must contain from about 25-48 weight percent 1,4-butylene terephthalate units and is further characterized by a melt index of less than about 50 g/10 min at 230° C.

The ethylene oxide-capped poly(propylene oxide) glycol can be prepared by condensation of propylene oxide with propylene glycol or water in the presence of a basic catalyst to form a poly(oxypropylene) homopolymer which is then reacted with ethylene oxide to obtain the copolymer.

The ethylene oxide content of the ethylene oxide-capped poly(propylene oxide) glycol must be between about 15-35 weight percent because at higher ethylene oxide contents the resulting copolyetheresters exhibit excessive water swell while at lower ethylene oxide levels phasing occurs during the melt condensation polymerization. Also, it is necessary that the glycol have a number average molecular weight of from about 1500 to 2800 because at a lower molecular weight the hardening rate of the resulting copolyetherester is unsatisfactory and at a higher molecular weight process difficulties during the polymer preparation such as phasing are encountered. Further, in order to obtain a copolyetherester composition having acceptable processing characteristics and physical properties it is necessary that the melt index be below the limit specified because lower molecular weight polymers are difficult to process at the higher process temperature required to melt the copolyetherester and they exhibit lower tensile and tear strength. In addition, it is essential that the copolyetherester composition contain a branching agent having a functionality of 3-6. The branching agent can be represented by the formula $(HO)_aX(COOH)_b$ where X is a polyfunctional radical, $a=0-6$, $b=0-4$, and the sum of $a+b=3-6$, and it has a molecular weight of from about 92-3000. It is necessary to the success of the present invention that the branching agent be present in the amount defined. When the branching agent is present in amounts of less than 1.5 equivalents, it becomes increasingly difficult to achieve a high degree of polymerization without excessive polymer degradation during the melt condensation polymerization. At concentrations above 6.0 equivalents the physical properties of injection molded parts are seriously impaired.

Terephthalic acid or its ester-forming equivalent and the ethylene oxide-capped poly(propylene oxide) glycol are incorporated into the copolyetherester in substantially the same molar proportions as are present in the reaction mixture. The amount of 1,4-butanediol actually incorporated corresponds to the difference between the moles of terephthalic acid and the capped poly(propylene oxide) glycol present in the reaction mixture.

The copolyetheresters described herein are made by a conventional ester interchange reaction in the presence of the branching agent. Preferably, an antioxidant is incorporated into the copolyetherester, usually added before polymerization with the monomers. If desired, a photostabilizer can also be added along with the antioxidant.

The preferred procedure for preparing the copolyetherester composition involves heating the dimethyl ester of terephthalic acid with the ethylene oxide-capped poly(propylene oxide) glycol and a molar excess of 1,4-butanediol in the presence of branching agent at a concentration of from 1.5-6.0 equivalents per 100 moles of terephthalic acid or ester-forming equivalent. The reaction is conducted in the presence of a catalyst such as tetrabutyl titanate at about 150°-260° C. and a pressure of 0.05-0.5 MPa, preferably ambient pressure, while distilling off methanol formed by the ester interchange. This procedure results in the formation of a low molecular weight prepolymer which can be carried to a high molecular weight copolyetherester by distillation of 1,4-butanediol. The second process stage is known as polycondensation. Additional ester interchange occurs during this polycondensation which serves to increase the molecular weight and to randomize the arrangement of the long and short chain ester units. Best results are usually obtained if this final distillation or polycondensation is run at less than about 670 Pa, preferably less than about 250 Pa, and about 200°-280° C., preferably about 230°-260° C., for less than about 2 hours, e.g., about 0.5-1.5 hours. If desired, solid phase polymerization can be employed to achieve the final molecular weight of the copolyetherester by isolating intermediate molecular weight polymer from the melt polycondensation in small particle size form and heating the solid polymer particles under vacuum or in a stream of an inert gas. In all instances, the polycondensation reaction should be continued until the copolyetherester has a melt index at 230° C. of less than about 50 g/10 minutes.

The branching agent has the general formula $(HO-)_a X(COOH)_b$ and has a molecular weight of about 92-3000. X is a polyfunctional radical and $a=0-6$, $b=0-4$ and the sum of $a+b$ must be 3-6. In more detail, the branching agent may be a polyol having 3-6 hydroxyl groups, a polycarboxylic acid having 3 or 4 carboxyl groups or a hydroxy acid having a total of 3-6 hydroxyl and carboxyl groups.

Representative polyols that function as branching agents that can be used include glycerol, trimethylol propane, pentaerythritol, 1,2,6-hexanetriol, sorbital, 1,1,4,4-tetrakis(hydroxymethyl)-cyclohexane, tris(2-hydroxyethyl)isocyanurate, and dipentaerythritol. In addition to those low molecular weight polyols, higher molecular weight polyols (MW 400-3000), particularly triols derived by condensing alkylene oxides having 2-3 carbons, e.g., ethylene oxide, propylene oxide with polyol initiators, which have 3-6 carbons, e.g., glycerol, can also be used as branching agents.

Representative polycarboxylic acids that can be used as branching agents include hemimellitic or trimellitic acid, trimesic acid, pyromellitic acid, 1,1,2,2-ethanetetracarboxylic acid, 1,1,2-ethanetricarboxylic acid, 1,3,5-pentanetricarboxylic acid, and 1,2,3,4-cyclopentanetetracarboxylic acid. Although the acids may be used as such, preferably they are used in the form of their lower alkyl esters or as their cyclic anhydrides in those instances were cyclic anhydrides can be formed.

Representative hydroxy acids that can be used as branching agents include malic acid, citric acid, tartaric acid, 3-hydroxyglutaric acid, mucic acid, trihydroxyglutaric acid, and 4-(beta-hydroxyethyl)-phthalic acid.

Preferably, branching agents in which a is 3 or 4 and b is 0 or b is 3 or 4 and a is 0 are preferred. Especially preferred branching agents include trimellitic anhydride, trimesic acid, oxypropylated triols (optionally capped with ethylene oxide) having molecular weight of 400-3000 and tris(2-hydroxyethyl) isocyanurate.

Usually, an antioxidant is added to the composition in an amount of up to 2 percent by weight of the copolyetherester. Generally, the amount of antioxidant that is added to and incorporated in the copolyetherester is from about 0.1-1% by weight of the copolyetherester. The antioxidants can be added with the monomers prior to the formation of the copolyetherester polymer or, if desired, they can be added to the molten polymer after polymerization has been completed. Preferably, the antioxidant is added with the monomers before polymerization is initiated. Both arylamine and phenolic antioxidants can be used, with the phenolics being preferred for non-discoloring compositions. A preferred arylamine antioxidant is 4,4'-bis($\alpha,\alpha$-dimethylbenzyl)diphenylamine. Preferred phenolic antioxidants are amide-containing phenolic antioxidants of the type described in U.S. Pat. No. 3,584,047 to Dexter. Preferred amide-containing phenolics are N,N'-hexamethylenebis(3,5-di-tert-butyl-4-hydroxyhydrocinnamamide) and N,N'-trimethylenebis(3,5-di-tert-butyl-4-hydroxyhydrocinnamamide) or mixtures thereof.

Properties of these copolyetherester compositions can be modified by incorporation of various conventional organic fillers, such as carbon black, silica gel, alumina, clays and chopped fiber glass. Improvement is light stability occurs by the addition of small amounts of pigments or the incorporation of a light stabilizer, such as ultraviolet light absorbers. The addition of hindered amine photostabilizers, such as bis(1,2,2,6,6-pentamethyl-4-piperidinyl) n-butyl-(3,5-di-tert-butyl-4-hydroxybenzyl)malonate, usually in amounts of from 0.05-1.0% by weight of the copolyetherester, are particularly useful in preparing compositions having resistance to photodegradation.

The polymers of this invention can be processed by most procedures which are used for thermoplastics. Because of their melt viscosity, melt stability and rapid hardening rate, they are suitable for injection molding, compression molding and extrusion. The polymers are useful for forming a variety of goods, including molded articles, films, tubing, hose and wire covers, where their excellent low temperature properties and resistance to oil is particularly beneficial in many end uses. In finely divided form, the polymers are suitable for rotational molding and powder coating. The polymers can be oriented by drawing to provide oriented forms such as films and fibers. The polymers can be blended with a wide range of other polymers and are particularly useful as impact modifiers in engineering plastics.

The following ASTM methods are employed in determining the properties of the polymers prepared in the examples which follow:

| | |
|---|---|
| Modulus at 100% elongation,[1] $M_{100}$ | D 412 |
| Modulus at 300% elongation,[1] $M_{300}$ | D 412 |
| Modulus at 500% elongation,[1] $M_{500}$ | D 412 |
| Tensile at Break,[1] $T_B$ | D 412 |
| Elongation at Break,[1] $E_B$ | D 412 |
| Hardness, Shore D and Shore A | D 2240 |
| Melt Index[2] | D 1238 |
| Split Tear[3] | D 470 |
| Tear Resistance, Die C | D 624 |
| Clash Berg torsional stiffness | D 1043 |

-continued

| Fluids Resistance | D 471 |
|---|---|

[1] Cross-head speed 50.8 cm/min.
[2] 2160 g load, drying conditions: 1 hr. at 135° C. 27 Pa
[3] Modified by use of 3.81 × 7.62 cm sample with 3.81 cm cut on the long axid of the sample. This configuration avoids "necking down" of the sample at the point of tearing. Cross-head speed 127 cm/min.

The following catalyst is used in preparing the copolyetheresters of the examples:

Catalyst

To 425 parts of anhydrous 1,4-butanediol in a round bottom flask is added 23.32 parts of tetrabutyl titanate. The mixture is agitated at 50° C. for 2-3 hours until the small amount of solids originally present disappears.

The following procedure is used for the preparation of the copolyetherester compositions of this invention.

EXAMPLE 1

A. The following materials are placed in an agitated flask fitted for distillation:

| | |
|---|---|
| ethylene oxide (EO)-capped poly(propylene) oxide) glycol (PPG) (number average molecular weight 2200, EO content 26.3 wt. %) | 39 parts |
| dimethyl terephthalate | 20 parts |
| 1,4-butanediol | 15 parts |
| trimellitic anhydride (TMA) | 0.25 parts* |
| Antioxidant A[4] | 0.12 parts |
| Antioxidant B[5] | 0.12 parts |
| Light Stabilizer A[6] | 0.3 parts |
| Catalyst | 2.4 parts |

*3.78 equivalents/100 moles terephthalic acid.

[4] N,N'-hexamethylenebis(3,5-di-tert-butyl-4-hydroxy-hydrocinnamamide)
[5] N,N'-trimethylenebis(3,5-di-tert-butyl-4-hydroxy-hydrocinnamamide)
[6] Bis(1,2,2,6,6-pentamethyl-4-piperidinyl) n-butyl-(3,5-di-tert.-butyl-4-hydroxybenzyl)malonate.

A stainless steel stirrer with a paddle cut to conform with the internal radius of the flask is positioned about ⅛ in. from the bottom of the flask and agitation is started. The flask is placed in an oil bath at 160° C., agitated for five minutes and then the catalyst is added. Methanol distills from the reaction mixture as the temperature is slowly raised to 250° C. over a period of one hour. When the temperature reaches 250° C., the pressure is gradually reduced to 133 Pa within 20 minutes. The polymerization mass is agitated at 250° C./133 Pa for 56 minutes. Then the polycondensation polymerization is discontinued by releasing the vacuum under nitrogen and the resulting viscous molten product is scraped from the flask in a nitrogen (water and oxygen free) atmosphere and allowed to cool. The resulting polymer has a melt index of 15.0 g/10 min. measured at 230° C.

B. The procedure described above for Example 1-A is repeated except that (1) an EO-capped PPG having a number average molecular weight of 2400 and an EO content of 17.9% and (2) 0.33 parts TMA (5.0 equivalents/100 mole terephthalic acid) is used. The resulting polymer has a melt index of 13.5 g/10 min. measured at 230° C.

C. For control purposes the procedure described above for Example 1-A is repeated except that the following EO-capped poly(propylene oxide) glycols and amounts of TMA are used:

| | Control Polymer I | Control Polymer II |
|---|---|---|
| EO content, % | 8.5 | 50.7 |
| Molecular Weight | 2120 | 1920 |
| TMA, parts | 0.35 | 0.28 |
| TMA, equiv./100 moles terephthalic acid | 5.28 | 4.24 |
| Melt index (230° C.), g/10 min. | 12.0 | 14.1 |

In spite of the higher TMA level used for the preparation of Control Polymer I, a 40% longer polycondensation cycle is necessary to achieve a comparable degree of polymerization.

For measuring the physical properties of the four polymer compositions, 1.0 mm slabs are prepared by compression molding of dry, shredded polymer at 210° C.; the testing data are summarized in Table I.

Table I

| | Polymer 1A | Polymer 1B | Control Polymer I | Control Polymer II |
|---|---|---|---|---|
| EO content of polyether glycol, % | 26.3 | 17.9 | 8.5 | 50.7 |
| Approx. short chain ester units, % | ← | ← 31 | → | → |
| Appearance of melt | ←translucent→ | | opaque | translucent |
| $M_{100}$, MPa | 5.9 | 5.9 | 5.2 | 5.9 |
| $M_{300}$, MPa | 8.4 | 8.3 | — | 8.5 |
| $M_{500}$, MPa | 10.5 | 10.4 | — | 10.4 |
| $T_B$, MPa | 15.0 | 11.2 | 7.3 | 13.9 |
| $E_B$, % | 1030 | 560 | 280 | 860 |
| Split tear, kN/m | 7.4 | 6.3 | 5.6 | 7.7 |
| Hardness, Durometer A | 85 | 85 | 84 | 85 |
| % Volume increase, water/3d/24° C. | 1.8 | 1.4 | 0.5 | 15.0 |

It is evident from the data summarized in Table I that only Polymers 1A and 1B exhibit a satisfactory combination of acceptable physical properties and moisture sensitivity. Control Polymer I has poor physical properties because of incompatibility (so-called "phasing") of long chain and short chain ester units in the melt, thus preventing the randomization of the long and short chain ester units in the polymer. Control Polymer II, on the other hand, exhibits excessive water swell and moisture sensitivity because of the hydrophilic nature of polyether glycol.

EXAMPLE 2

The procedure described above for Example 1A is repeated except that the following EO-capped poly(propylene oxide) glycols are used:

|  | Polymer 2 | Control Polymer III |
|---|---|---|
| EO content of poly(propylene oxide) glycol, % | 26.9 | 26.7 |
| Molecular Weight | 1836 | 3130 |

The physical properties of the resulting polymers after compression molding are shown in Table II.

Table II

|  | Polymer 2 | Control Polymer III |
|---|---|---|
| Melt index at 230° C., g/10 min. | 11.5 | 15.5 |
| Appearance of melt | translucent | opaque |
| $M_{100}$, MPa | 5.5 | 5.3 |
| $M_{300}$, MPa | 7.8 | 7.6 |
| $M_{500}$, MPa | 10.5 | — |
| $T_B$, MPa | 14.7 | 7.9 |
| $E_B$, % | 1050 | 370 |
| Tear resistance, Die C, kN/m | 63 | 38 |

Because of the high molecular weight of the polyether glycol used for the preparation of Control Polymer III, melt phasing during the synthesis is taking place which has an adverse effect on polymer properties such as tensile strength and tear resistance.

EXAMPLE 3

The procedure described above for Example 1A is repeated except the length of the polycondensation cycles are varied resulting in different melt index grades of polymer. The physical properties of the resulting polymers are shown in Table III.

Table III

|  | Polymer | | | Control Polymer | |
|---|---|---|---|---|---|
|  | 3A | 3B | 3C | IV | V |
| Melt index as 230° C. g/10 min. | 16.2 | 28 | 49.5 | 95* | 165* |
| $M_{100}$, MPa | 6.0 | 5.9 | 5.9 | 5.9 | 6.0 |
| $M_{300}$, MPa | 8.5 | 8.1 | 8.1 | 7.9 | 8.5 |
| $M_{500}$, Mpa | 10.3 | 9.5 | 9.4 | 9.1 | — |
| $T_B$, MPa | 14.6 | 13.4 | 12.4 | 10.4 | 8.6 |
| $E_B$, % | 920 | 1000 | 940 | 700 | 400 |
| Tear Resistance, Die C, kN/m | 62 | 57 | 47 | 42 | 33 |

*324 g load used, melt index calculated for 2160 g load by multiplying by a factor of 2160/324.

When Example 3 is repeated without the use of a branching agent such as TMA, the minimum melt index (measured at 230° C.) achievable after very long polycondensation cycles is 73 g/10 minutes.

It is evident from the data of Table III that the high melt index Control Polymers IV and V are deficient in respect to tensile strength and tear resistance when compared with the properties of the polymers of this invention. Furthermore, the Control Polymers are difficult to process by injection molding or extrusion because of their very low melt viscosity at the high processing temperature of 200°–220° C.

EXAMPLE 4

The procedure described above for Example 1A is repeated except that the following amounts of TMA are employed:

|  | Amount of TMA (parts) | TMA Content of Polymer (equiv. /100 moles terephthalic acid) | Melt Index at 230° C. (g/10 min) |
|---|---|---|---|
| Polymer 4A | 0.25 | 3.78 | 20.7 |
| Polymer 4B | 0.40 | 6.0 | 25.0 |
| Control Polymer VI | 0.50 | 7.5 | 16.5 |

The three copolyetheresters are injection molded on a "3 oz. Van Dorn Injection Molder" under the following conditions:

| Barrel Temperature, °C. | |
|---|---|
| Rear | 177 |
| Center | 193 |
| Front & Nozzle | 202 |
| Ram Pressure, MPa | 77 |
| Injection Time, sec. | 20 |
| Mold Closed Time, sec. | 25 |
| Cycle Time, sec. | 50 |
| Mold Temperature, °C. | 24 |

The stress-strain properties of injection molded dumbbells (thickness 1.87 mm) prepared from the three polymer compositions of this example are tabulated in Table IV.

TABLE IV

|  | Polymer 4A | Polymer 4B | Control Polymer VI |
|---|---|---|---|
| $M_{100}$, MPa | 9.0 | 9.8 | — |
| $T_B$, MPa | 10.7 | 10.5 | 9.9 |
| $E_B$, % | 140 | 110 | 77 |

Above data show that because of the high degree of branching, Control Polymer VI is deficient in respect to its elastomeric properties compared to the performance of Polymer 4A and 4B.

EXAMPLE 5

A. The procedure described above for Example 1A is repeated except the following starting materials are used:

| EO-capped PPG (number average molecular weight 2400, EO content 17.9%) | 57.2 parts |
|---|---|
| dimethyl terephthalate | 38.7 parts |
| 1,4-butanediol | 24.0 parts |
| TMA | 0.4 parts* |
| Antioxidant A | 0.2 parts |
| Antioxidant B | 0.2 parts |
| Catalyst | 3.5 parts |

*2.1 equiv./100 moles

B. The procedure described immediately above for Example 5A is repeated except that 0.53 parts (2.1 equivalents/100 moles) of branching agent tris(2-hydroxyethyl) isocyanurate is used instead of 0.4 parts TMA.

C. The procedure described above for Example 5A is repeated except that 1.25 parts (2.1 equivalents/100 moles) of a branching agent which is a triol prepared by oxypropylating glycerol and having a number average molecular weight of about 600 is used instead of 0.4 parts TMA.

The physical properties of the three polymer compositions measured on compression molded 1 mm slabs are tabulated in Table V.

Table V

|  | Polymer 5A | Polymer 5B | Polymer 5C |
| --- | --- | --- | --- |
| Short chain ester unit content, % | 39.0 | 39.0 | 39.0 |
| Melt index at 230° C., g/10 min. | 25.0 | 6.5 | 11.0 |
| $M_{100}$, MPa | 9.1 | 7.7 | 8.0 |
| $M_{300}$, MPa | 10.5 | 10.5 | 10.3 |
| $T_B$, MPa | 15.3 | 17.4 | 13.9 |
| $E_B$, % | 730 | 810 | 700 |
| Split tear, kN/m | 6.5 | 8.2 | 7.0 |
| Hardness, Durometer A | 89 | 90 | 89 |
| % Volume Increase |  |  |  |
| $H_2O$/3 days/24° C. | 0.6 | 0.7 | 0.7 |
| ASTM #3 oil/7 days/100° C. | 25 | 24 | 27 |
| Clash Berg Torsional Modulus, MPa |  |  |  |
| 24° C. | 17.8 | 18.4 | 17.5 |
| −45° C. | 20.5 | 21.2 | 19.7 |
| −56° C. | 37.8 | 40.5 | 38.0 |

I claim:

1. A copolyetherester composition derived from terephthalic acid or its ester-forming equivalent, 1,4-butanediol, an ethylene oxide-capped poly(propylene oxide) glycol and a branching agent having a functionality of 3–6, said ethylene oxide-capped poly(propylene oxide) glycol having an ethylene oxide content of from about 15–35 weight percent and a number average molecular weight ranging from about 1500–2800, and said branching agent being present in a concentration of from about 1.5–6.0 equivalents per 100 moles of terephthalic acid or ester-forming equivalent thereof; and said copolyetherester composition containing from about 25–48 weight percent, 1,4-butylene terephthalate units and having a melt index at 230° C. of less than about 50 grams per 10 minutes.

2. A copolyetherester composition of claim 1 wherein the ethylene oxide content of the ethylene oxide-capped poly(propylene oxide) glycol is from about 20–30 weight percent.

3. A copolyetherester composition of claim 2 wherein the number average molecular weight of the ethylene oxide-capped poly(propylene oxide) glycol is from about 1900–2500.

4. A copolyetherester of claim 3 containing 2.5–5.5 equivalents per 100 moles of terephthalic acid of a branching agent.

5. A copolyetherester of claim 3 wherein the branching agent is trimellitic anhydride.

6. A copolyetherester of claim 3 containing up to 2 weight percent antioxidant.

7. A copolyetherester of claim 6 containing the antioxidant N,N'-hexamethylenebis(3,5-di-tert-butyl-4-hydroxyhydrocinnamamide) or N,N'-trimethylenebis(3,5-di-tert-butyl-4-hydroxyhydrocinnamamide) or mixtures thereof.

8. A copolyetherester of claim 3 containing the photostabilizer bis(1,2,2,6,6-pentamethyl-4-piperidinyl) n-butyl-3,5-di-tert-butyl-4-hydroxybenzyl)-malonate.

* * * * *